(12) United States Patent
Gokan et al.

(10) Patent No.: US 6,676,464 B2
(45) Date of Patent: Jan. 13, 2004

(54) SUPERCHARGER COOLING STRUCTURE FOR SMALL WATERCRAFT

(75) Inventors: Yoshitsugu Gokan, Saitama (JP); Kazunori Okada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/173,842

(22) Filed: Jun. 19, 2002

(65) Prior Publication Data

US 2003/0017760 A1 Jan. 23, 2003

(30) Foreign Application Priority Data

Jul. 19, 2001 (JP) ........................................ 2001-219319

(51) Int. Cl.[7] .............................................. B63H 11/00
(52) U.S. Cl. ........................ 440/39; 440/88 D; 440/88 J
(58) Field of Search ................................ 440/39, 88 D, 440/88 E, 88 J, 89 C

(56) References Cited

U.S. PATENT DOCUMENTS 4,977,743 A * 12/1990 Aihara et al. ............... 60/605.3
5,251,439 A * 10/1993 Nakase et al. ................. 60/310
6,409,558 B1 * 6/2002 Gokan et al. .................. 440/89

FOREIGN PATENT DOCUMENTS

| JP | 59-119926 | * | 8/1984 |
| JP | 2001140641 A | | 5/2001 |

* cited by examiner

*Primary Examiner*—Sherman Basinger
(74) *Attorney, Agent, or Firm*—Birch, Stewart, Kolasch & Birch, LLP

(57) ABSTRACT

To provide a supercharger cooling structure for a small watercraft which can sufficiently cool the supercharger. In a small watercraft in which an engine with a supercharger is incorporated, cooling water from a jet pump is supplied to the supercharger through a different supercharger cooling water passage independent of any other cooling water passage. The cooling water from the supercharger cooling water passage is first supplied to the supercharger to cool the supercharger and then supplied to an exhaust system provided on the downstream with respect to the supercharger in an exhaust system for the engine, whereafter it is discharged to the outside of the watercraft together with exhaust gas. Oil is supplied to the supercharger for lubrication of a bearing portion of the supercharger and is supplied to an oil jacket formed in a bearing casing to cool the bearing casing.

16 Claims, 14 Drawing Sheets

SUPERCHARGER COOLING STRUCTURE FOR SMALL WATERCRAFT

CROSS-REFERENCE TO RELATED APPLICATIONS

This nonprovisional application claims priority under 35 U.S.C. § 119(a) on Patent Application No. 2001-219319 filed in Japan on Jul. 19, 2001, the entirety of which is hereby incorporated by reference.

BACKGROUND OF THE INVENTION

1. Field of the Invention

This invention relates to a supercharger cooling structure for a small watercraft.

2. Description of Background Art

The power source in widespread small watercrafts (for example, personal watercrafts(PWCs)) conventionally is a 2-cycle engine. However, it has been examined to use a 4-cycle engine for the power source in order to cope with the reduction of pollution in recent years.

However, the output power of a 4-cycle engine is lower than that of the 2-cycle engine of the same total stroke volume. Accordingly, it has been examined to incorporate an engine with a supercharger in order to make up for the loss of power. The assignee of the present application has proposed a small watercraft, in which an engine with a supercharger is incorporated, in Japanese Patent Laid-Open No. 2001-140641.

In the small watercraft 1 disclosed in the above document, a 4-cycle engine 2 with a supercharger 3 is incorporated in the inside of a body 1 as shown in FIGS. 11 and 12 of the present invention.

As shown also in FIGS. 13 and 14 of the present invention, an exhaust manifold 4 is provided on the left side of the 4-cycle engine 2 in an advancing direction F of the body 1. An intake chamber 5 is provided on the right side of the 4-cycle engine 2.

Exhaust gas from an exhaust gas exit 4a of the exhaust manifold 4 is introduced into a turbine portion 3T of the supercharger 3. Compressed air from a compressor portion 3C of the supercharger 3 is supplied into the intake chamber 5 described above through an intercooler 6.

A cooling structure for the supercharger 3 is such that cooling water from a cooling water output port of a jet pump 7 driven by the engine 2 is supplied, through a cooling water hose (not shown) from a water entrance 4b (refer to FIG. 13) of the exhaust manifold 4 into a water jacket in the exhaust manifold 4. The water having cooled the exhaust manifold 4 is supplied from a cooling water exit 4c of the exhaust manifold 4 through a hose (not shown) into a water jacket in the supercharger 3 from a water entrance 3a (refer to FIG. 14) of the supercharger 3 to cool the supercharger 3.

In the background art described above, water having cooled the exhaust manifold 4 is introduced into the supercharger 3 to cool the supercharger 3. Accordingly, there is a problem in that the supercharger 3 cannot always be cooled sufficiently.

SUMMARY OF THE INVENTION

The object of the present invention resides in a solution of such a problem as described above to provide a supercharger cooling structure for a small watercraft which can cool the supercharger sufficiently.

In order to attain the object described above, according to a first aspect of the present invention, a supercharger cooling structure for a small watercraft in which an engine with a supercharger is incorporated includes cooling water from a pump being supplied to the supercharger through a different supercharger cooling water passage independent of any other cooling water passage.

According to a second aspect of the present invention, the supercharger cooling structure for a small watercraft according to the first aspect of the present invention includes the cooling water from the supercharger cooling water passage being first supplied to the supercharger to cool the supercharger and then supplied to an exhaust system provided downstream from the supercharger in an exhaust system for the engine.

According to a third aspect of the present invention, the supercharger cooling structure for a small watercraft according to the first and second aspects of the present invention includes the cooling water having cooled the supercharger being supplied to an exhaust pipe provided downstream from the supercharger in an exhaust system and is then discharged to the outside of the watercraft together with exhaust gas.

According to a fourth aspect of the present invention, the supercharger cooling structure for a small watercraft according to the first through third aspects of the present invention includes oil supplied to the supercharger. The oil is used for lubrication of a bearing portion of the supercharger and is supplied to an oil jacket formed in a bearing casing to cool the bearing casing.

With the supercharger cooling structure for a small watercraft according to the first aspect of the present invention, the small watercraft, in which the engine with a supercharger is incorporated, is structured such that cooling water from the pump is supplied to the supercharger by the different supercharger cooling water passage independent of any other cooling water passage. Accordingly, the supercharger can be cooled efficiently and sufficiently.

With the supercharger cooling structure for a small watercraft according to the second aspect of the present invention, the cooling water from the supercharger cooling water passage is first supplied to the supercharger to cool the supercharger and is then supplied to the exhaust system provided downstream from the supercharger in the exhaust system for the engine. Accordingly, in addition to the advantages of the first aspect of the present invention, the supercharger can be cooled with cooling water in a state having a low temperature. Accordingly, the supercharger can be further cooled efficiently and sufficiently. Furthermore, the exhaust system provided downstream from the supercharger can be cooled.

With the supercharger cooling structure for a small watercraft according to the third aspect of the present invention, the cooling water having cooled the supercharger is discharged to the outside of the watercraft together with exhaust gas after it is supplied to the exhaust pipe provided on the downstream with respect to the supercharger in the exhaust system. Accordingly, the exhaust gas which has driven the supercharger is further cooled in the exhaust pipe.

In other words, since the exhaust gas is cooled in the supercharger and the exhaust pipe, the exhaust gas energy can be reduced synergetically. As a result, the exhaust noise can be reduced.

With the supercharger cooling structure for a small watercraft according to the fourth aspect of the present invention, oil is supplied to the supercharger. The oil is used to lubricate the bearing portion of the supercharger and is supplied to the oil jacket formed in the bearing casing to cool the bearing casing. Accordingly, the supercharger can be cooled more efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of the present invention will be described with reference to the accompanying drawings.

Figure 1:
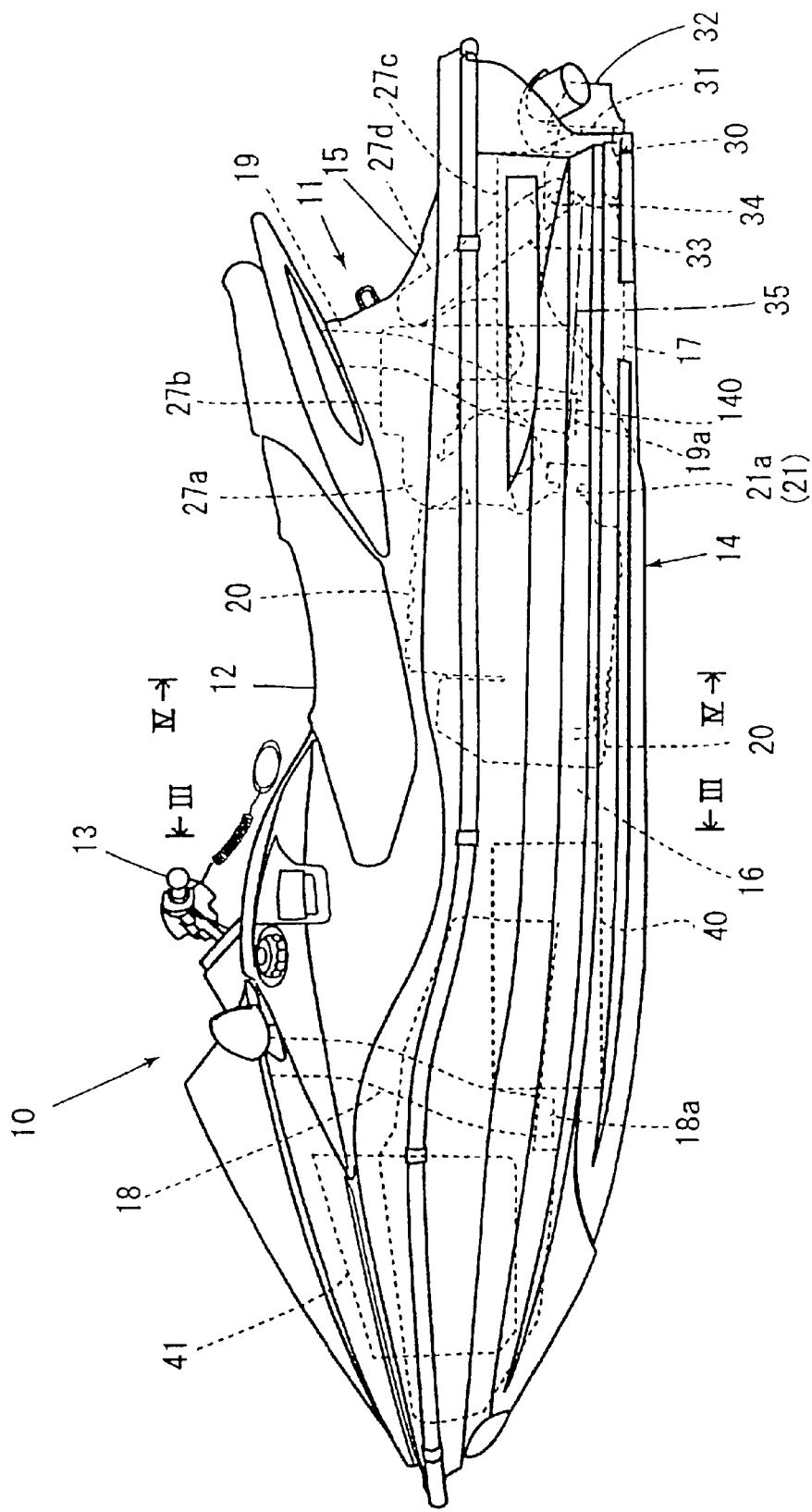
FIG. 1 is a schematic side elevational view showing an example of a small watercraft which includes an embodiment of the supercharger cooling structure for a small watercraft according to the present invention.
Figure 2:
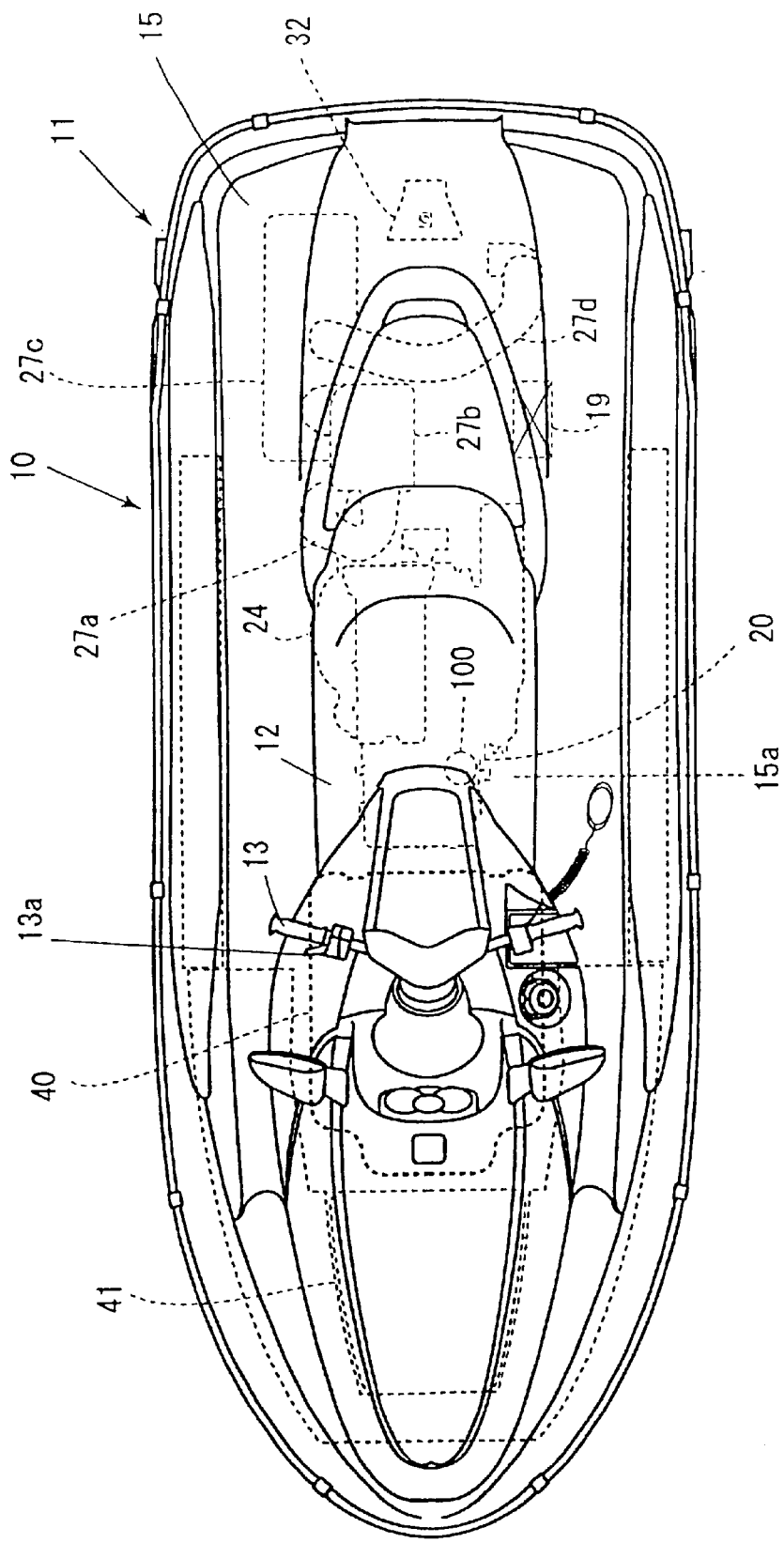
FIG. 2 is a plan view of the small watercraft of FIG. 1.
Figure 3:
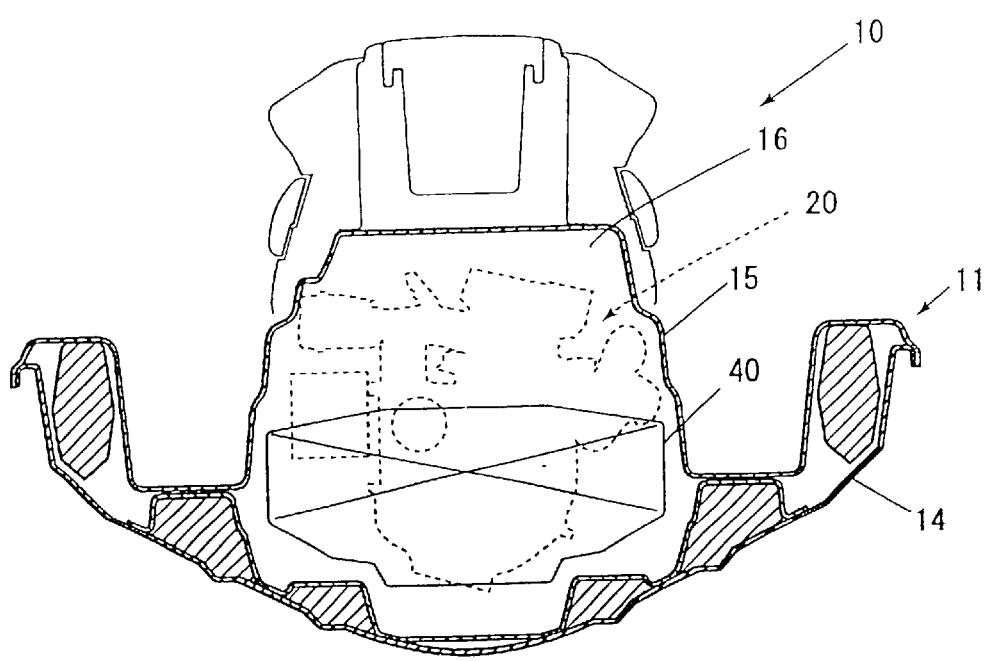
FIG. 3 is a partial enlarged sectional view (partly omitted sectional view) taken along line III—III of FIG. 1.

FIG. 1 is a schematic side elevational view showing an example of a small watercraft which includes an embodiment of the supercharger cooling structure for a small watercraft according to the present invention, FIG. 2 is a plan view of the same, and FIG. 3 is a partial enlarged sectional view (partly omitted sectional view) taken along line III—III of FIG. 1.

As shown in the figures (principally in FIG. 1), small watercraft 10 is a personal watercraft of the saddle type. A driver can sit on a seat 12 on a body 11 and grip a steering handle 13 with a throttle lever to steer the small watercraft 10.

The body 11 has a floating body structure wherein a hull 14 and a deck 15 are joined together such that a space 16 is formed in the inside thereof. In the space 16, an engine 20 is mounted on the hull 14. A jet pump (jet propulsion pump) 30 acts as propulsion means for driving the small watercraft 10. The jet pump 30 is driven by the engine 20 and is provided at a rear portion of the hull 14.

The jet pump 30 includes a passage 33 extending from an intake 17 open to the bottom to a jet outlet 31, a nozzle 32 open to the rear end of the body and an impeller 34 disposed in the passage 33. A shaft 35 of the impeller 34 is connected to an output power shaft 21a of the engine 20. Accordingly, if the impeller 34 is driven to rotate by the engine 20, then water taken in from the intake 17 is jetted from the nozzle 32 through the jet outlet 31 so that the body 11 is propelled. The driving speed of the engine 20, that is, the propelling force by the jet pump 30, is operated by the pivoting operation of a throttle lever 13a (refer to FIG. 2) of the steering handle 13 described above. The nozzle 32 is operatively associated with the steering handle 13 by an operation wire (not shown) such that it is pivoted by an operation of the steering handle 13. Accordingly, the advancing direction can be changed by operating the steering handle 13.

It should be noted that reference numeral 40 denotes a fuel tank, and 41 an accommodation chamber.

Figure 4:
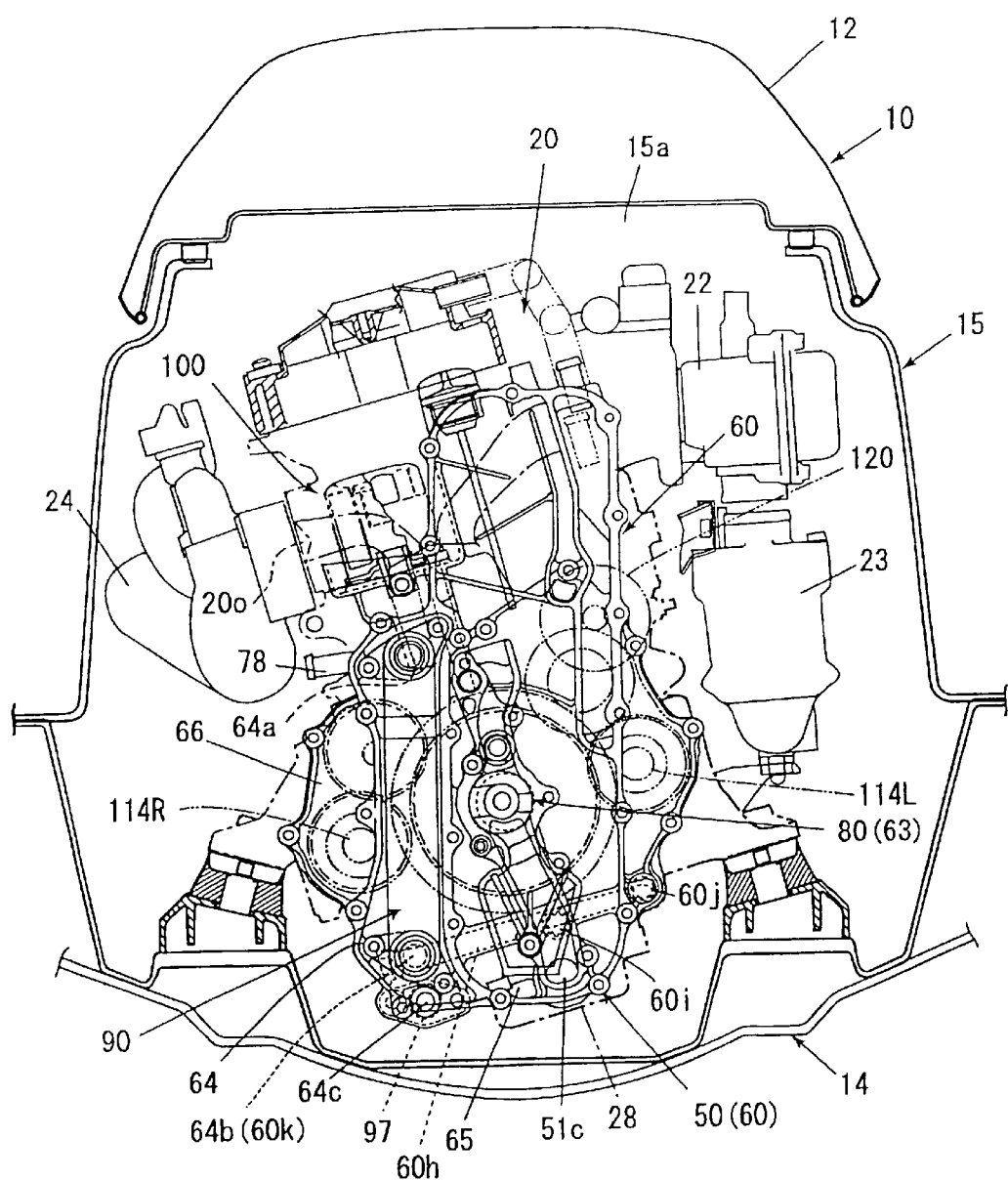
FIG. 4 is a view principally showing an engine 20 and is a partial enlarged sectional view (partly omitted sectional view) taken along line IV—IV of FIG. 1.
Figure 5:
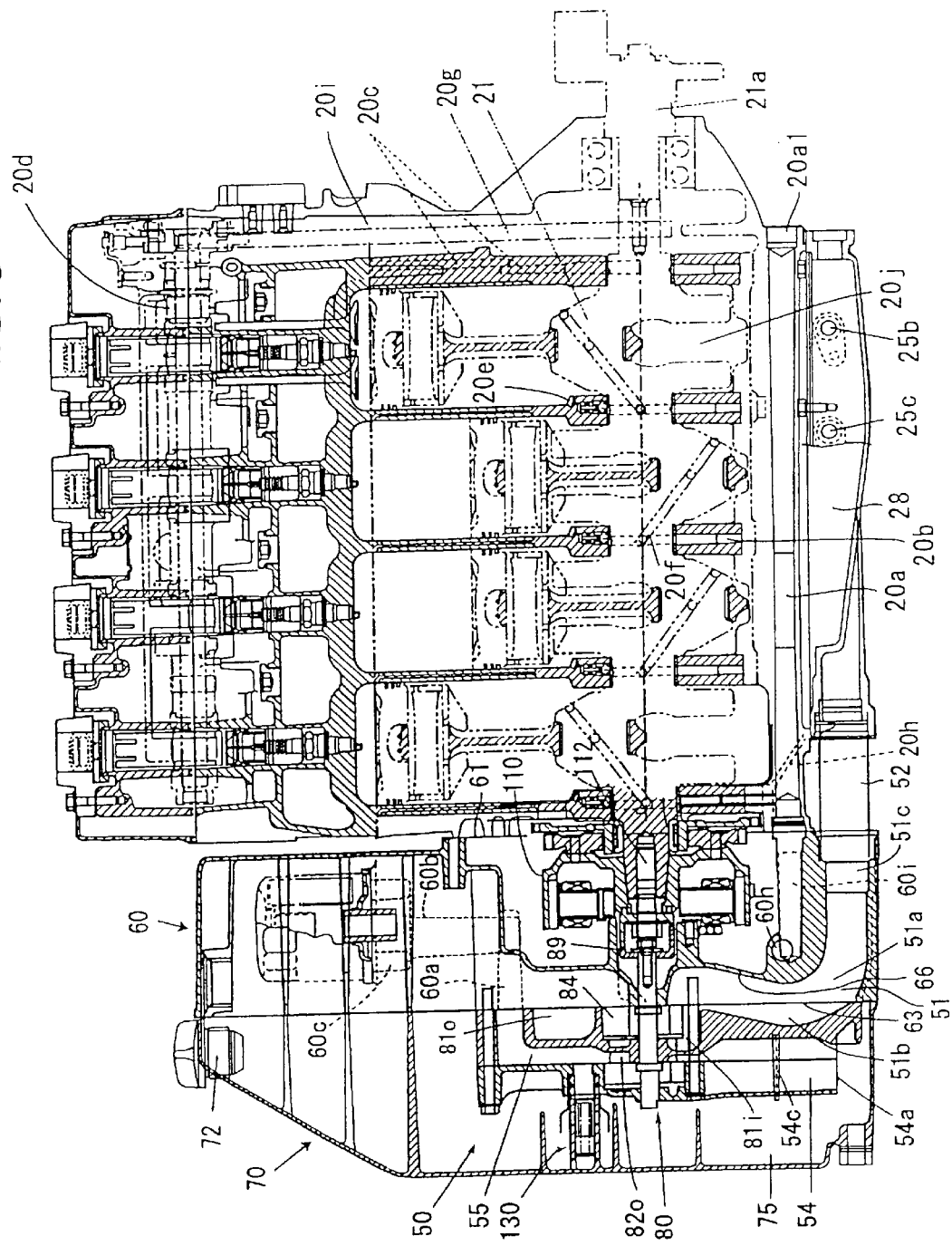
FIG. 5 is a right side elevational view of the engine 20.
Figure 6:
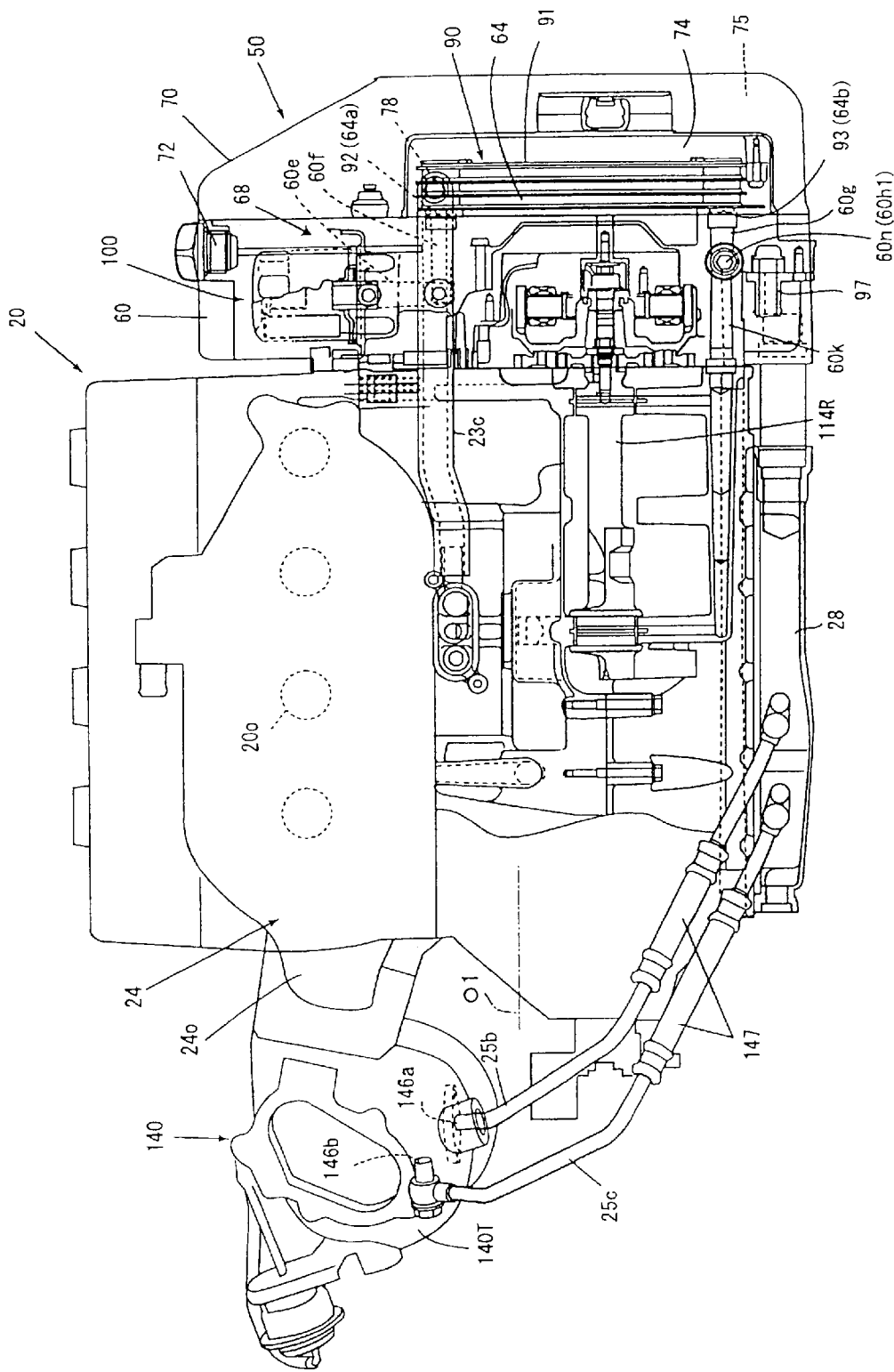
FIG. 6 is a left side elevational view of the engine 20.
Figure 7:
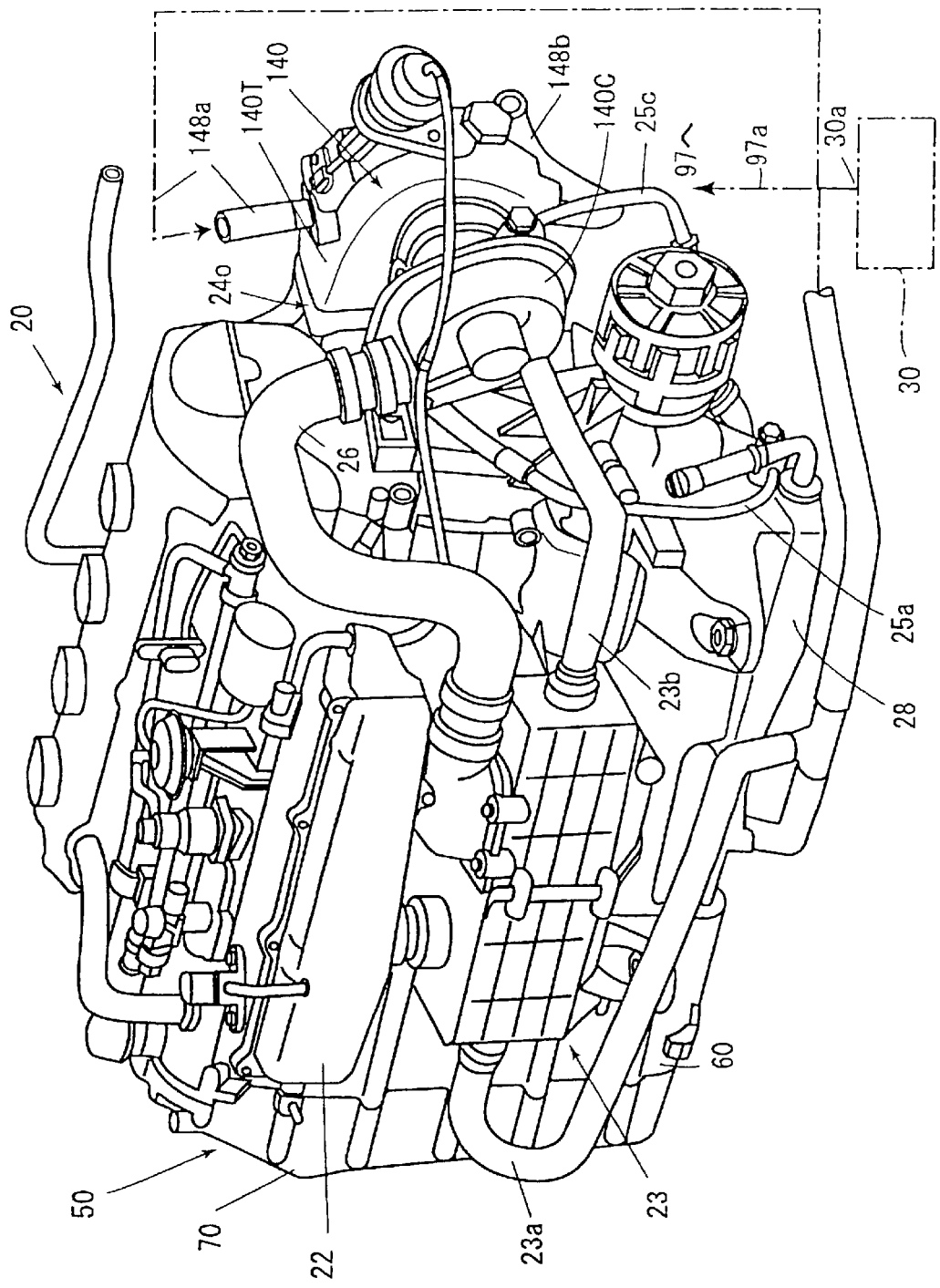
FIG. 7 is a schematic rearward perspective view of the engine 20 viewed obliquely.
Figure 8:
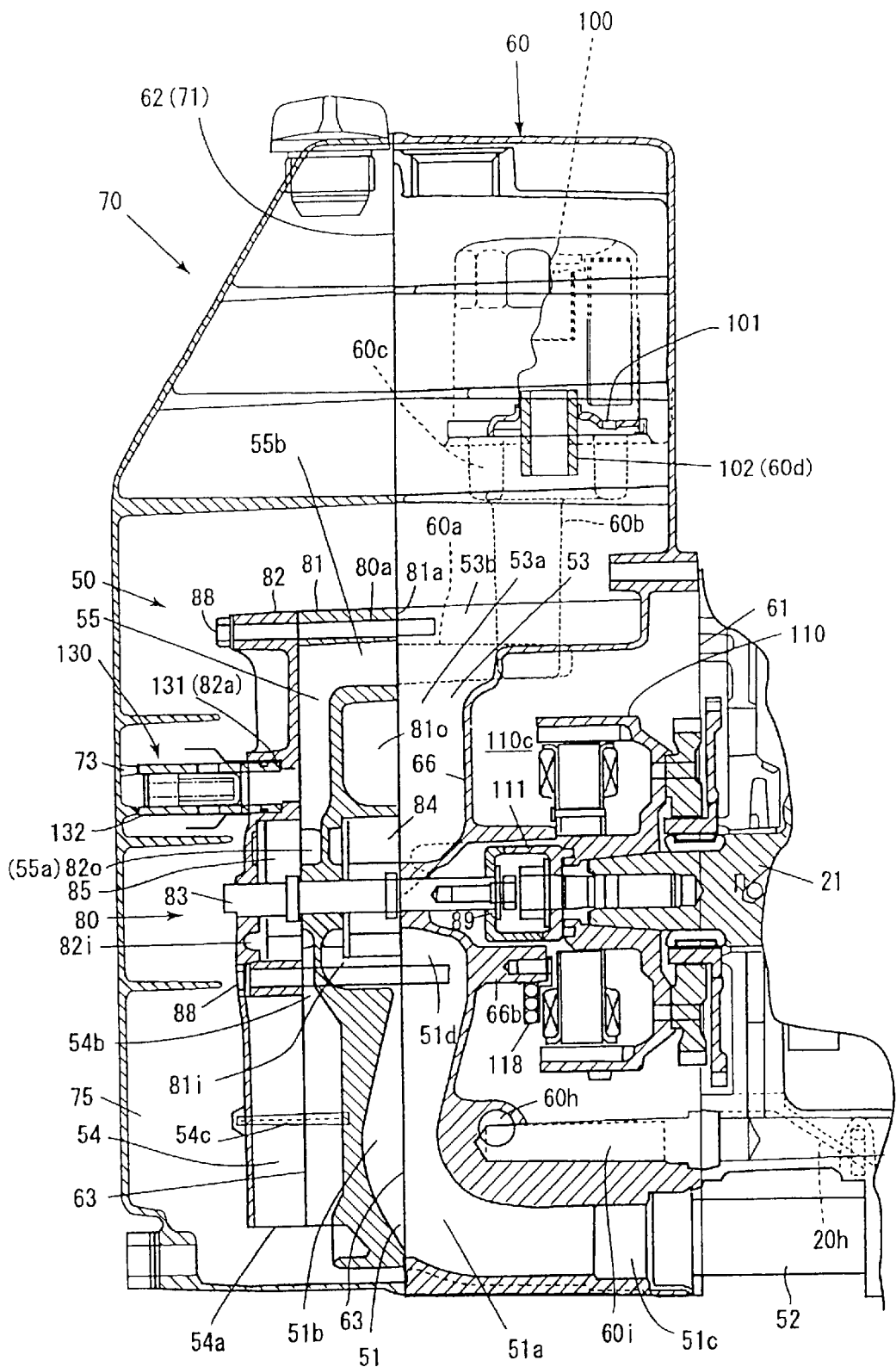
FIG. 8 is a partial enlarged view of FIG. 5.

FIG. 4 is a view principally showing the engine 20 and is a partial enlarged sectional view (partly omitted sectional view) taken along line IV—IV of FIG. 1, FIG. 5 is a right side elevational view of the engine 20, FIG. 6 is a left side elevational view of the engine 20, FIG. 7 is a schematic perspective view of the engine 20 as viewed from obliquely rearwardly, and FIG. 8 is a partial enlarged view of FIG. 5.

The engine 20 is a DOHC in-line four-cylinder dry sump type 4-cycle engine and is disposed such that the crankshaft 21a thereof extends in the forward and backward direction of the body 11 as shown in FIG. 1.

As shown in FIGS. 4 and 7, a surge tank (intake chamber) 22 and an intercooler 23 in communication with an intake port are connected and disposed on the left side of the engine 20 with respect to the advancing direction of the body 11. An exhaust manifold 24 in communication with an exhaust port 20o is connected and disposed on the right side of the engine 20.

As shown in FIGS. 6 and 7, a turbocharger (supercharger) 140 is disposed rearwardly of the engine 20. An exhaust gas exit 24o of the exhaust manifold 24 is connected to a turbine portion 140T of the turbocharger 140 while the intercooler 23 is connected to a compressor portion 140C of the turbocharger 140 by a pipe 26 (refer to FIG. 7). In FIG. 7, reference characters 23a and 23b each denote a cooling water hose connected to the intercooler 23.

It should be noted that exhaust gas which has rotated a turbine in the turbine portion 140T of the turbocharger 140 passes, as shown in FIGS. 1 and 2, through an exhaust pipe 27a, a backflow preventing chamber 27b for preventing a backflow of water (admission of water into the turbocharger 140 and so forth) upon capsize, a water muffler 27c and a drain pipe 27d and is exhausted into a water stream produced by the jet pump 30.

Referring to FIG. 1, reference numerals 18, 19 each denote an intake duct for introducing the atmospheric air outside the body 11 into the space 16 in the body 11. Lower ends 18a, 19a of the intake ducts 18, 19 are provided lower than the turbocharger 140 described above in the body 11. In other words, the turbocharger 140 is provided higher than the openings 18a, 19a of the intake ducts 18, 19 in the body. The turbocharger 140 is provided substantially in the center in the vertical direction in the space 16 of the body.

As shown in FIGS. 4 to 7, an oil tank 50 and an oil pump 80 are provided integrally on an extension line of a crankshaft 21 at a front portion of the engine 20 (in the advancing direction of the body 11, and at a left portion in FIGS. 1 and 5). The oil pump 80 is provided in the oil tank 50.

The oil tank 50 is formed from a tank body (one divided case) 60 joined to a front face of the engine 20 and a cover (the other divided case) 70 joined to a front face of the tank body 60.

As shown in FIGS. 4 and 6, a water cooling type oil cooler 90 is provided on the front face of the tank body 60 in the oil tank 50. An oil filter 100 is provided at an upper portion of the oil tank 50.

As shown in FIGS. 4, 5 and 8, the tank body 60 has a joining face 61 to the front face of the engine 20, a joining face 62 to the cover 70, a mounting portion 63 for the oil pump 80, a mounting portion 64 for the water cooling type oil cooler 90, a generally vertically elongated oil accommodation portion 65 defined by partition walls and outer walls which form the mounting surfaces of them, an ACG 110, balancer shafts 114L, 114R, and a cover portion 66 for a drive chamber of a starter motor 120. Furthermore, as shown in FIG. 6, the tank body 60 has a mounting portion 68 for the oil filter 100.

The tank body 60 is joined at the joining face 61 thereof described above to the front face of the engine 20 and is integrally secured to the front face of the engine 20 by bolts (not shown) in such a manner that it covers the elements described above. It is to be noted that the tank body 60 is attached to the front face of the engine 20 after the oil pump 80 and the water cooling type oil cooler 90 are attached thereto.

The cover 70 has a joining face 71 to the tank body 60, a refilling opening 72 for oil, a holding portion 73 for a relief valve 130, an accommodation portion 74 (refer to FIG. 6) for the oil cooler 90, and an oil accommodation portion 75 defined by outer walls and a partition wall.

The oil pump 80 includes a first case 81 joined to the tank body 60 described above, a second case 82 joined to the first case 81, a pump shaft 83 provided such that it extends through the first and second cases, inner and outer rotors 84 coupled to the pump shaft 83 in the first case 81 described above for recovering oil, and inner and outer rotors 85 coupled to the pump shaft 83 in the second case 82 described above for supplying oil.

The inner and outer rotors 84 for recovering oil cooperate with the first case 81 to form an oil recovery pump. The inner and outer rotors 85 for supplying oil cooperate with the first and second cases 81, 82 to form an oil supply pump.

The oil pump 80 is attached to the front face of the tank body 60 by means of bolts 88 after the joining face of the first case 81 to the tank body 60 is jointed to the mounting portion 63 on the front face of the tank body 60 formed in the same shape as that of the joining face.

After the oil pump 80 is attached to the tank body 60 in this manner, a coupling 89 is secured to the rear end of the pump shaft 83 from the rear face side of the tank body 60 by means of bolts.

Accordingly, the tank body 60 is attached to the front face of the engine 20 such that the coupling 89 is coupled to a coupling 111 provided at an end of an ACG shaft after the oil pump 80 and the coupling 89 are attached and the oil cooler 90 is attached.

The water cooling type oil cooler 90 is attached to the front face side of the mounting portion 64 of the tank body 60 for the oil cooler 90.

As shown in FIGS. 4 and 6, an upper hole 64a and a lower hole 64b which are in communication with an oil passage, which is hereinafter described, are formed in the mounting portion 64 of the tank body 60.

The oil cooler 90 has a plurality of heat exchanging plates 91 through the inside of which oil passes, an entrance pipe 92 for oil in communication at an upper portion thereof with the inside of the plates 91, and an exit pipe 93 for oil in communication at a lower portion thereof with the inside of the plates 91.

Accordingly, the oil cooler 90 is attached to the mounting portion 64 of the tank body 60 such that the entrance pipe 92 thereof is connected to the upper hole 64a of the tank body 60 and the exit pipe 93 thereof is connected to the lower hole 64b of the tank body 60.

As shown in FIGS. 4 and 6, a cooling water introduction pipe 97 which is in communication with a hole 64c open to the mounting portion 64 and introduces cooling water into the accommodation portion 74 of the oil cooler in the mounting portion 64 and the cover 70 is provided on the tank body 60. A discharge pipe 78 for water is provided in the cover 70. A cooling water hole 97a from a cooling water output port 30a (refer to FIG. 7) of the jet pump 30 is connected directly to the introduction pipe 97 without intervention of any other cooling object. A drain pipe 23c is connected to the discharge pipe 78 as shown in FIG. 6. Water from the discharge pipe 78 is supplied into the water jacket of the exhaust manifold 24 through the drain pipe 23c.

The cover 70 is joined to the front face of the tank body 60 and is secured by means of bolts (not shown) such that a front end 132 of the relief valve 130 is held down by the holding portion 73 described hereinabove after the tank body 60, oil pump 80 and oil cooler 90 are attached to the front face of the engine 20 in such a manner as described above. A rear end 131 of the relief valve 130 is then fitted into a hole 82a formed in the front face of the second case 82 of the oil pump 80 as shown in FIGS. 5 and 8. The relief valve 130 is disposed horizontally in this manner.

In the state wherein the tank body 60 and the cover 70 are joined together, a single oil accommodation section is formed from the oil accommodation portions 65, 75 between the tank body 60 and the cover 70. Furthermore, the oil filter 100 is attached to the mounting portion 68 of the tank body 60 for the oil filter 100.

It should be noted that, in a state wherein the engine 20 is incorporated in the body 11, the engine 20 and the oil filter 100 are opposed to an opening 15a of the deck 15 as shown in FIGS. 2 and 4. The opening 15a of the deck 15 is opened by removing the seat 12 from the body 11. The seat 12 is removably mounted on the body 11.

Such oil passages as described below are formed in a state wherein the oil tank 50 (that is, the tank body 60, the cover 70, and the oil pump 80, oil cooler 90, and relief valve 130 built in them) is mounted on the front face of the engine 20 and the oil filter 100 is mounted.

As shown in FIGS. 5 and 8, an oil recovery passage 51 is formed by the front face of the tank body 60 and the rear face of the first case 81 of the oil pump 80. The recovery passage 51 is formed from an oil passage 51a formed on the tank body 60 side and an oil passage 51b formed on the first case 81 side of the oil pump 80 in an opposing relationship to the oil passage 51a.

A lower end 51c of the oil recovery passage 51 is in communication with an oil pan 28 of the engine 20 through a pipe 52. An upper end 51d of the oil recovery passage 51 is in communication with a recovered oil inlet port 81i formed in the first case 81 of the oil pump 80.

Similarly, a discharge passage 53 for recovered oil is formed by the front face of the tank body 60 and the rear face of the first case 81 of the oil pump 80. The discharge passage 53 is formed from an oil passage 53*a* formed on the tank body 60 side and a recovered oil discharge port 81*o* formed on the first case 81 side of the oil pump 80 in an opposing relationship to the oil passage 53*a*.

An upper end 53*b* of the discharge path 53 is open to the inside of the oil tank 50 (that is, to the inside of the oil accommodation section). An intake passage 54 and a discharge passage 55 for supply oil are formed by the front face of the first case 81 and the rear face of the second case 82 of the oil pump 80.

A lower end 54*a* of the intake passage 54 is open to the inside of the oil tank 50 (that is, to the inside of the oil accommodation section). An upper end 54*b* of the intake passage 54 is in communication with a supply oil inlet port 82*i* of the oil supply pump. A screen oil filter 54*c* is provided in the intake passage 54.

A lower end 55*a* of the discharge passage 55 is in communication with a supply oil discharge port 82*o* of the oil supply pump. An upper end 55*b* of the discharge passage 55 extends horizontally through an upper portion of the first case 81 and is in communication with a horizontal hole 60*a* formed in the tank body 60. The horizontal hole 60*a* is in communication with a vertical hole 60*b* formed in the tank body 60 similarly. An upper end 60*c* of the vertical hole 60*b* is open in the form of a ring as viewed in plan to the mounting portion 68 of the oil filter 100. An oil inlet passage 101 of the oil filter 100 is in communication with the opening 60*c*.

The mounting hole 82*a* for the relief valve 130 described hereinabove is open to the discharge passage 55. The relief valve 130 is attached in such a manner as described above to the mounting hole 82*a*.

A male thread is provided on an oil exit pipe 102 in the oil filter 100. The oil filter 100 is attached to the mounting portion 68 of the tank body 60 by screwing the oil exit pipe 102 into a female threaded hole 60*d* formed in the mounting portion 68 of the tank body 60.

As shown in FIG. 6, a vertical hole 60*e* and a horizontal hole 60*f* in communication with a lower end of the vertical hole 60*e* are formed at a lower portion of the female threaded hole 60*d* in the tank body 60. The horizontal hole 60*f* is in communication with the entrance pipe 92 of the oil cooler 90 through the upper hole 64*a* of the mounting portion 64 of the oil cooler 90 described hereinabove.

An oil passage 60*g* in communication with the lower hole 64*b* and an oil distributing passage 60*h* in communication with the passage 60*g* are formed in the lower hole 64*b* of the tank body 60 described hereinabove to which the exit pipe 93 of the oil cooler 90 is connected. Furthermore, a main gallery supply passage 60*i* for supplying oil to a main gallery 20*a* (refer to FIG. 5) of the engine 20, a left balancer supply passage 60*j* for supplying oil to bearing portions of the left balancer 114L described hereinabove and a right balancer supply passage 60*k* for supplying oil to bearing portions of the right balancer 114R are in communication with the oil distributing passage 60*h*.

It should be noted that one end of the oil distributing passage 60*h* is closed up with a plug 60*n* (refer to FIG. 6).

Figure 9:
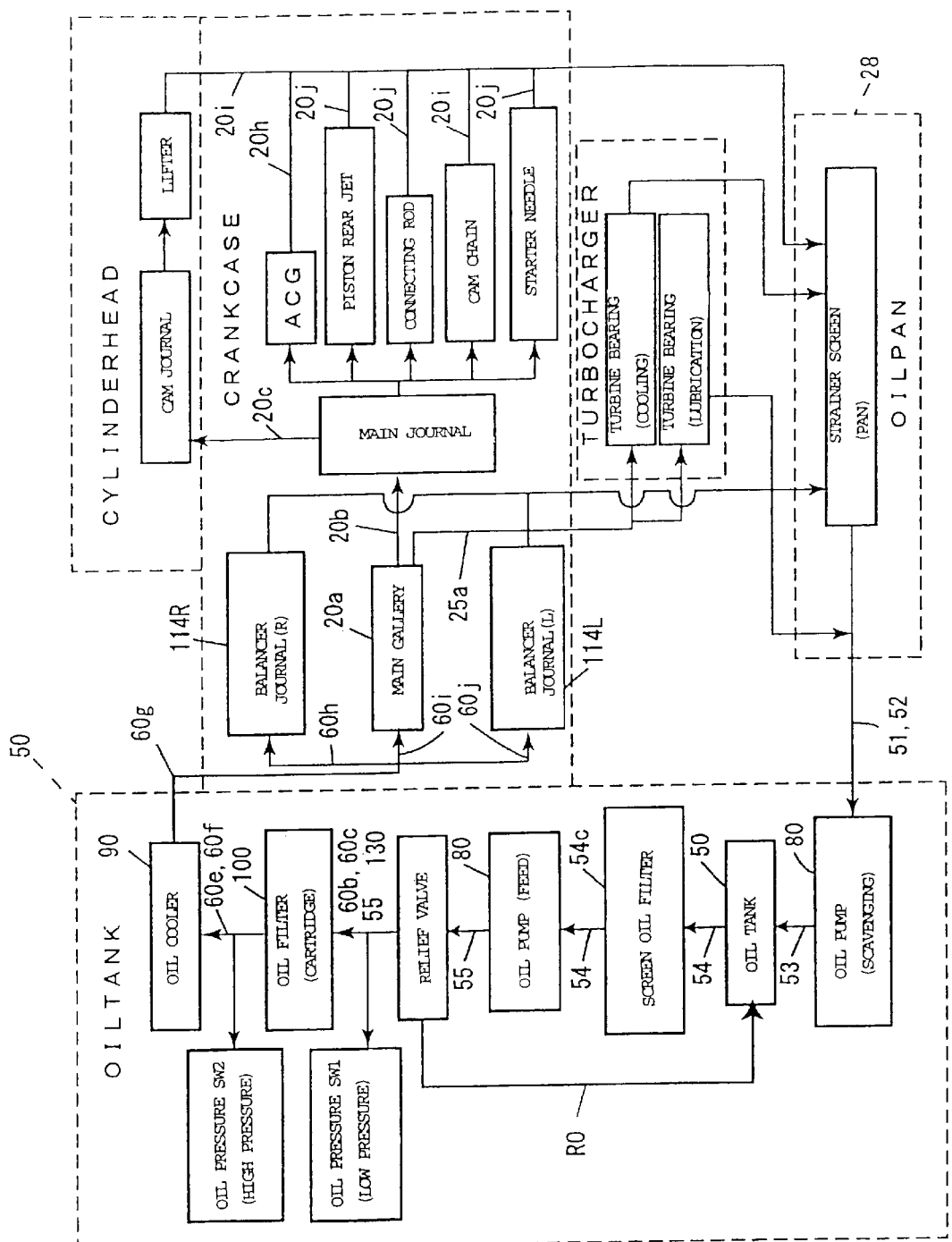
FIG. 9 is a view of a circulation route of oil.

The route of oil supplied to the main gallery 20*a* of the engine 20 is shown in FIG. 9 (oil circulation route diagram).

The route from the main gallery 20*a* is generally divided into two. The first route is a route along which oil is supplied to bearing portions of the crankshaft 21 through a route 20*b* (refer to FIG. 5). The second route is a route along which oil is supplied from a rear end 20*a*1 of the main gallery 20*a* through a pipe 25*a* (refer to FIG. 7) to cool and lubricate turbine bearings of the turbocharger 140. The oil which has cooled and lubricated the turbine bearings of the turbocharger 140 is recovered into the oil pan 28 through pipes 25*b*, 25*c* (refer to FIG. 6).

The oil supplied to the bearing portions of the crankshaft 21 further lubricates cam journal 20*d* portions and lifter portions of a cylinder head through a route 20*c* and then returns to the oil pan 28 through a chain chamber 20*i*.

The oil supplied to the bearing portions of the crankshaft 21 is further supplied to the ACG, piston rear jet nozzles, connecting rod, cam chain and starter needle and is recovered into the oil pan 28 through respective recovery passages. In FIG. 5, reference character 20*e* denotes a jet nozzle for jetting oil to the rear side of the piston to cool the piston, 20*f* a passage to the connecting rod portion, and 20*g* the cam chain. Furthermore, reference character 20*h* denotes a returning passage for oil from an ACG chamber 110*c*.

The oil in the ACG chamber returns to the oil pan 28 through a return passage 20*h* therefor. Oil jetted to the rear of the pistons from jet nozzles 20*e*, the oil supplied to the connecting rod and the oil supplied to the starter needle return to the oil pan 28 individually through a crank chamber 20*j*.

As is apparent from the foregoing description, a general flow of oil is described below with reference principally to FIG. 9.

The oil tank 50, intake passage 54, screen oil filter 54*c*, oil pump (supply pump) 80, discharge passage 55 (and relief valve 130, horizontal hole 60*a*, vertical hole 60*b*, ring-form opening 60*c*), oil filter 100, vertical hole 60*e*, horizontal hole 60*f*, oil cooler 90, oil passage 60*g*, oil distributing passage 60*h*, main gallery supply passage 60*i*, left balancer supply passage 60*j*, right balancer supply passage 60*k*, main gallery 20*a*, left balancer 114L, right balancer 114R.

Relief oil RO from the relief valve 130 returns directly into the oil tank 50.

Oil supplied to the left balancer 114L, right balancer 114R returns to the oil pan 28 through the crank chamber 20*j*.

Oil supplied to the various portions described above from the main gallery 20*a* returns to the oil pan 28 in such a manner as described above.

The oil returned to the oil pan 28 is then recovered into the oil tank 50 through the pipe 52, recovery passage 51, oil pump 80 (recovery pump) and recovered oil discharge path 53, and is circulated by the route described above from the intake passage 54.

Figure 10:
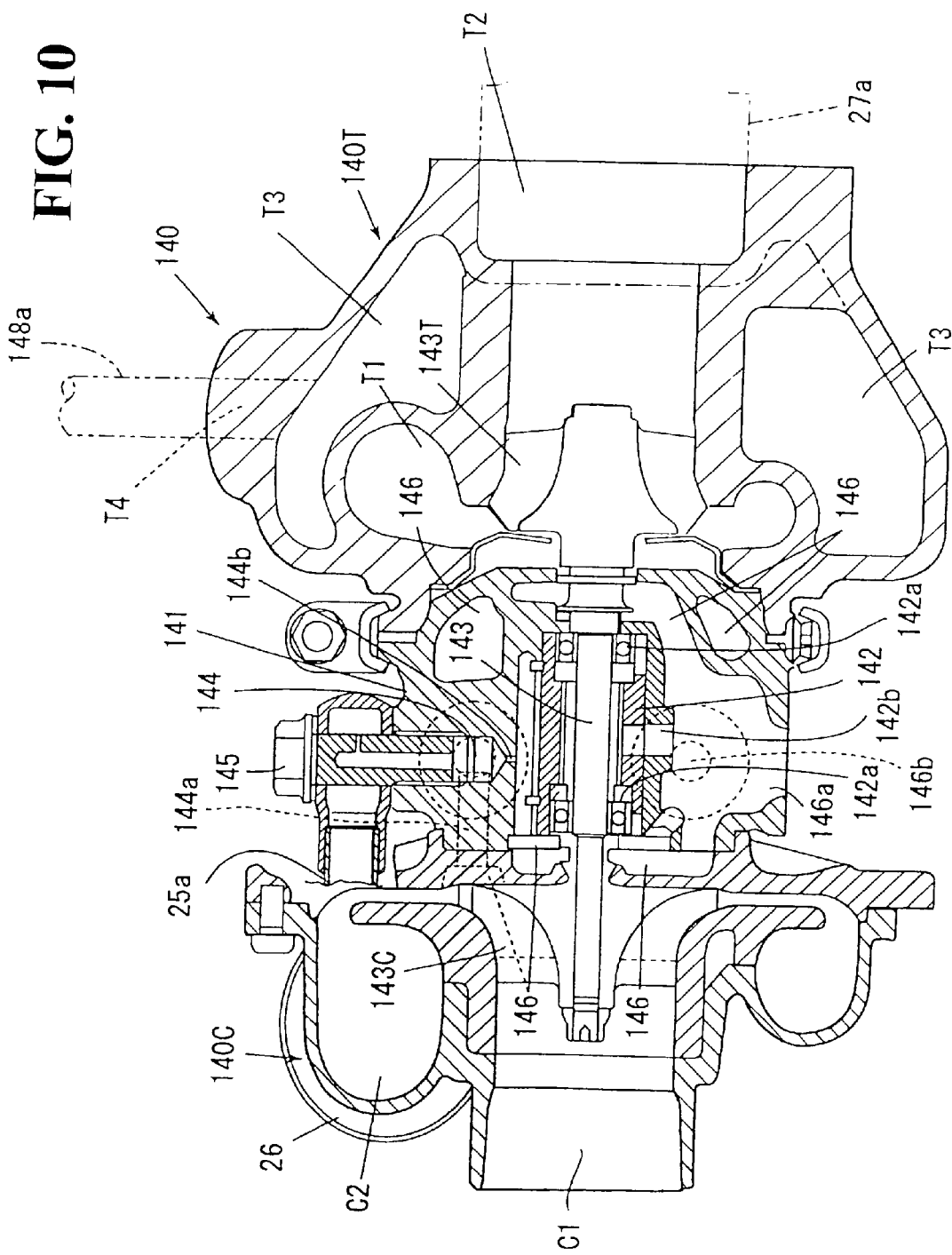
FIG. 10 is a sectional view of a turbocharger 140.
Figure 11:
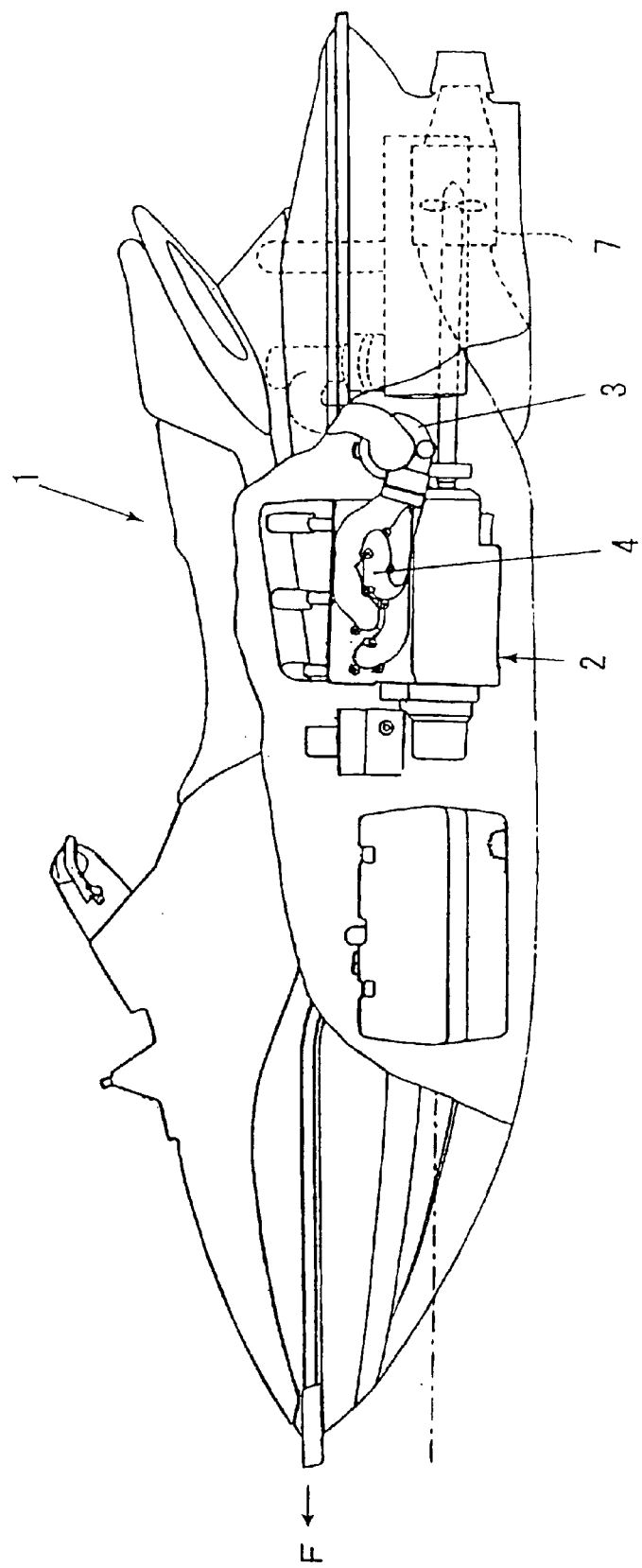
FIG. 11 is an explanatory view of the background art.
Figure 12:
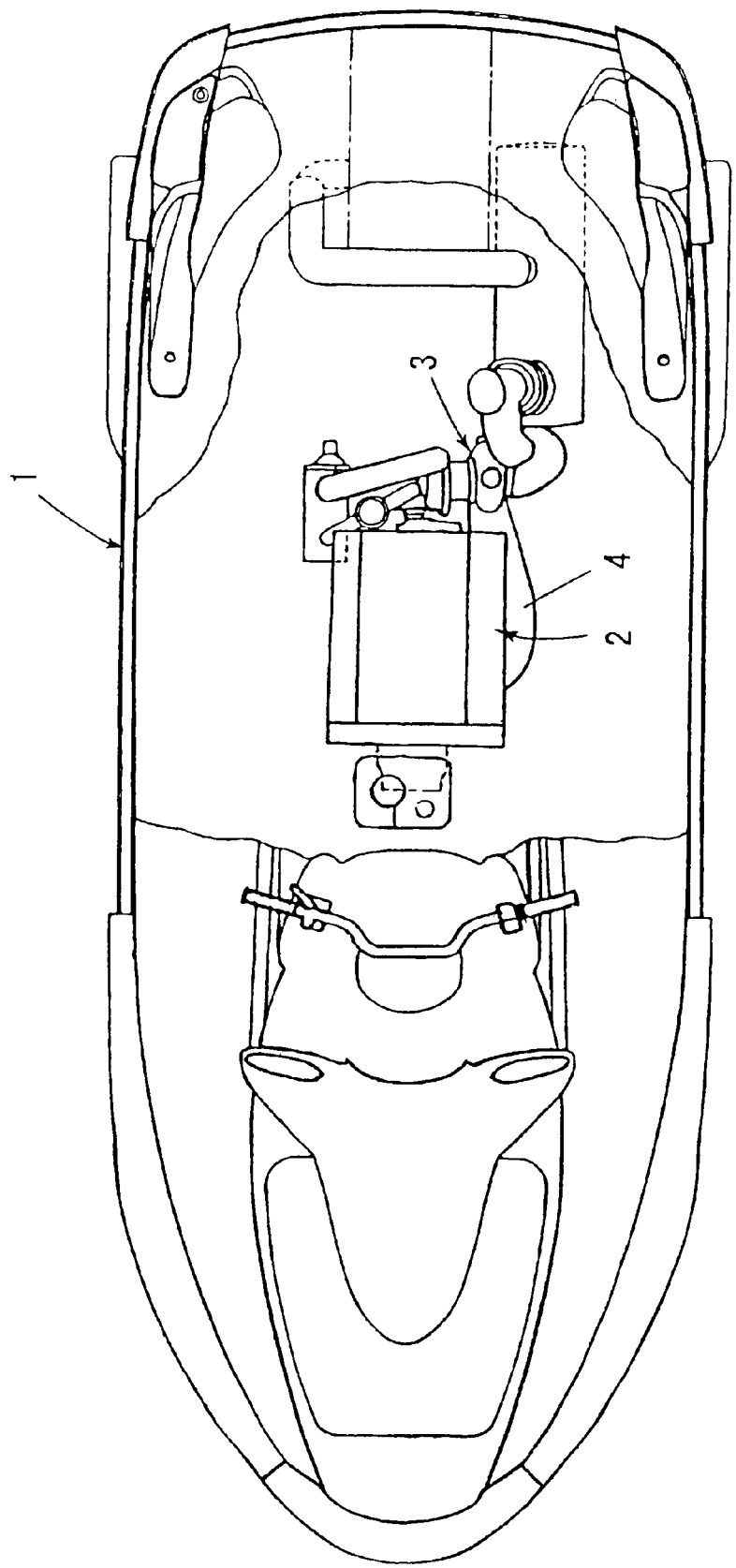
FIG. 12 is an explanatory view of the background art.
Figure 13:
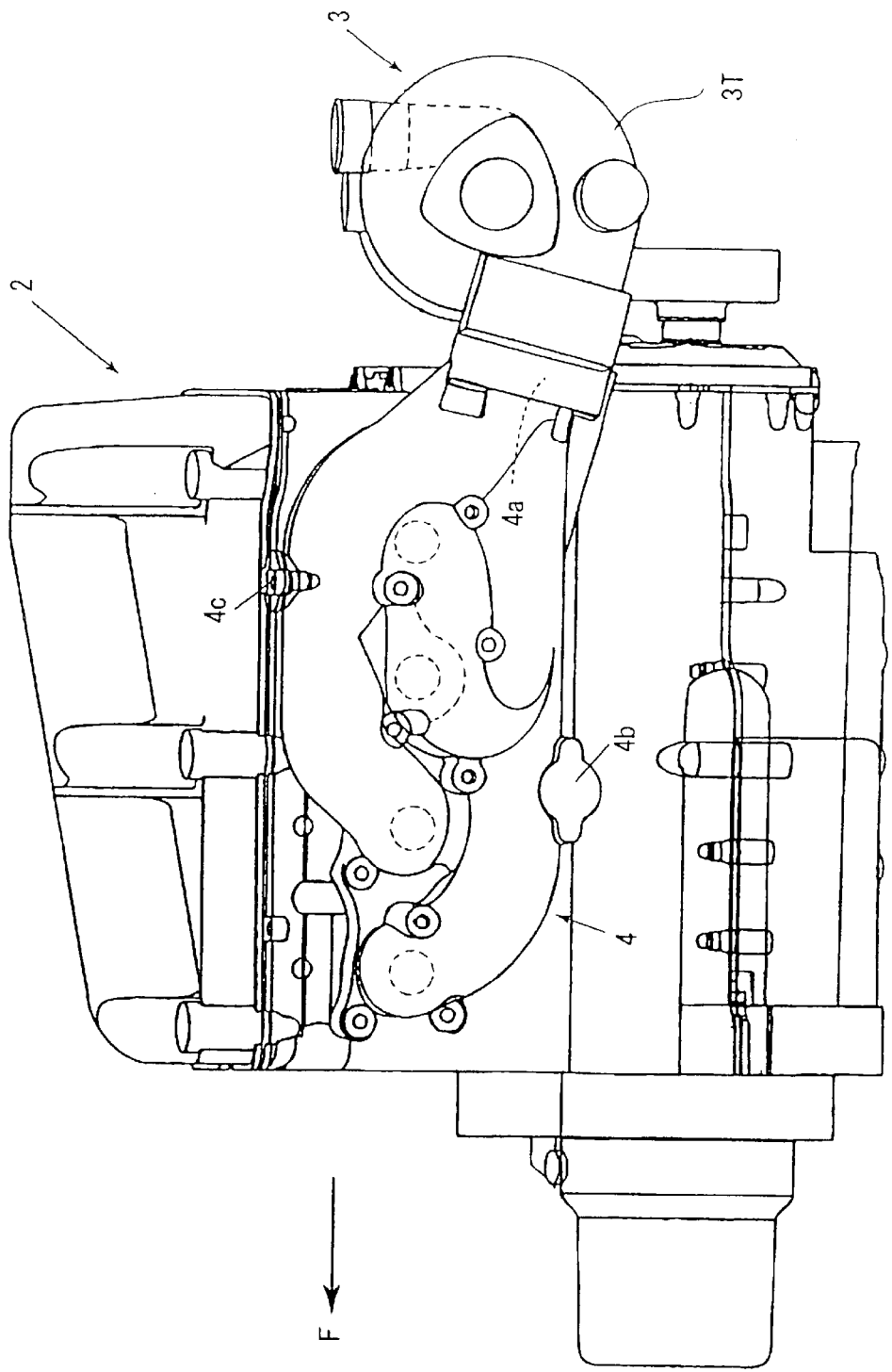
FIG. 13 is an explanatory view of the background art.
Figure 14:
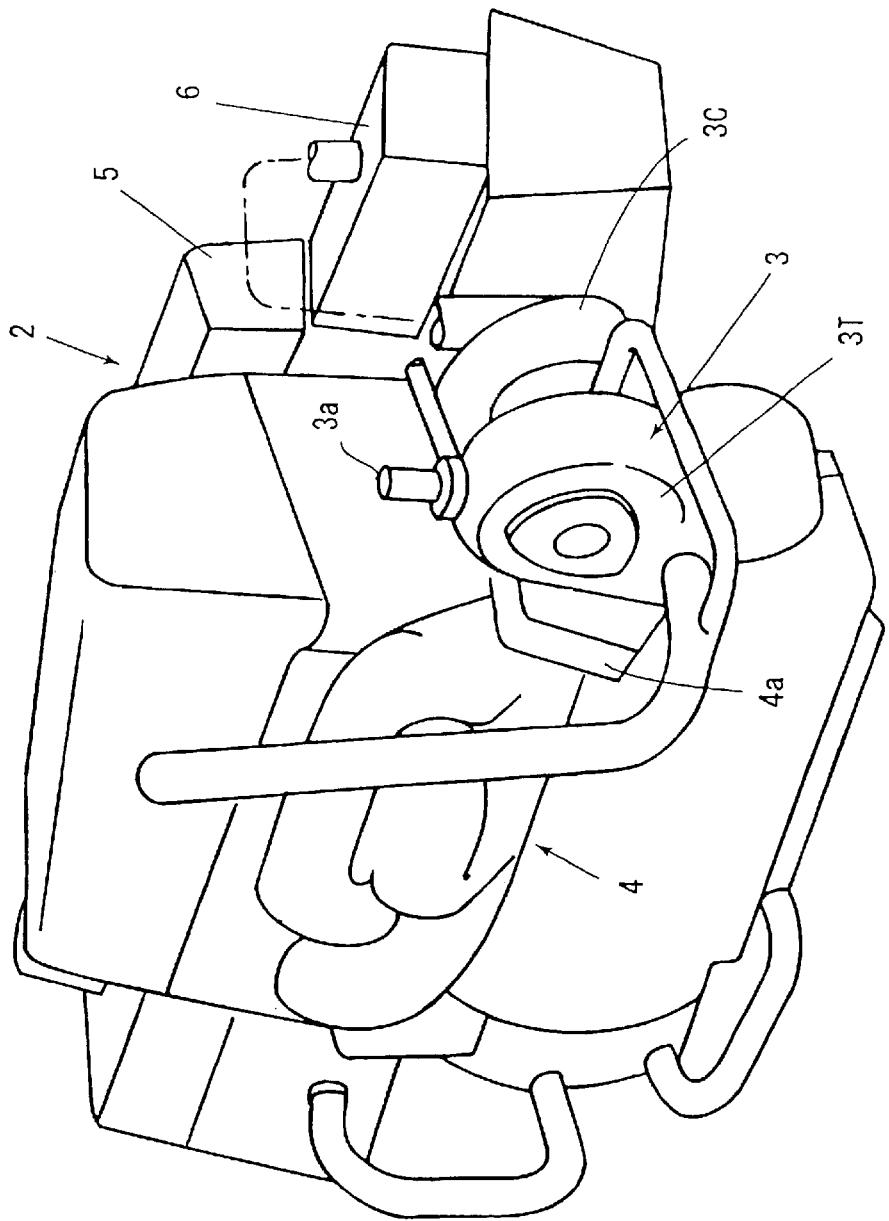
FIG. 14 is an explanatory view of the background art.

FIG. 10 is a sectional view of the turbocharger 140.

As described above, the turbocharger 140 includes the turbine portion 140T and the compressor portion 140C. The turbocharger 140 further includes a bearing casing 141, which interconnects the turbine portion 140T and the compressor portion 140C.

A bearing portion (accommodation chamber for a bearing member) 142 is provided in the bearing casing 141. A turbine shaft 143 is supported for rotation by bearing members (ceramic ball bearings) 142*a* of the bearing portion 142.

Turbine blades 143T are secured to the turbine shaft 143 adjacent the turbine portion 140T. Compressor blades 143C are secured to the turbine shaft 143 adjacent the compressor portion 140C.

Accordingly, within a process wherein exhaust gas from the exhaust manifold 24 described hereinabove is exhausted from an exhaust gas exit T2 to the exhaust pipe 27*a* (refer to FIGS. 1 and 2) described hereinabove through an exhaust passage T1 in the turbine portion 140T, the turbine shaft 143 is driven to rotate, and the compressor blades 143C are driven to rotate so that air from an intake air inlet port C1 in communication with an intake box (not shown) is fed under pressure from the pipe 26 (refer to FIG. 7) to the intercooler 23 through an intake passage C2 in the compressor portion 140C.

An oil entrance 144 is provided at an upper portion of the bearing casing 141. The oil entrance 144 is in communication with the rear end portion 20a1 of the main gallery 20a by the pipe 25a (refer to FIG. 7) described hereinabove which services as an oil supply passage. The pipe 25a is connected to the oil entrance 144 by an orifice bolt 145.

An oil jacket 146 is formed in the inside of the bearing casing 141. The oil entrance 144 described above is in communication with the oil jacket 146 by an oil passage 144a. The bearing portion 142 is in communication with the oil entrance 144 by a thin oil passage 144b.

Accordingly, oil entering from the oil entrance 144 is supplied from the oil passage 144a to the oil jacket 146 to cool the bearing casing 141, bearing portion 142, turbine shaft 143 and members around them, and is supplied from the oil passage 144b to the bearing portion 142 to lubricate the bearing portion 142.

The oil of the oil jacket 146 is recovered into the oil pan 28 from oil exits 146a and 146b of the oil jacket 146 through the pipes 25b, 25c (refer to FIG. 6) described hereinabove. The oil of the bearing portion 142 once enters the oil jacket 146 from an exit 142b of the bearing portion 142 and then is recovered into the oil pan 28 from the oil exits 146a and 146b of the oil jacket 146 described above through the pipes 25b, 25c (refer to FIG. 6) described hereinabove.

The pipe 25b is connected to the oil exit 146a, and the pipe 25c is connected to the oil exit 146b.

The oil exits 146a, 146b are disposed higher than an oil surface O1 (refer to FIG. 6) when the engine stops.

Furthermore, a one-way valve 147 is interposed in each of the pipes 25b, 25c which serve as an oil returning path.

As shown in FIG. 10, a water jacket T3 is formed in the casing of the turbine portion 140T. An entrance T4 for cooling water of the water jacket T3 is connected to the cooling water output port 30a (refer to FIG. 7) of the jet pump 30 described hereinabove by a pipe 148a which forms a different supercharger cooling water passage independent of the other cooling water passages. Furthermore, an exit (not shown) of the water jacket T3 for cooling water is connected to a water jacket of the exhaust pipe 27a (refer to FIGS. 1, 2) by a pipe 148b shown in FIG. 7.

Accordingly, cooling water from the jet pump 30 is supplied to the water jacket T3 of the turbocharger 140 directly without intervention of any other cooling object and cools the turbocharger 140, whereafter it cools the exhaust pipe 27a. It should be noted that the water having cooled the exhaust pipe 27a further flows into a water jacket of the backflow preventing chamber 27b to cool the backflow preventing chamber 27b and is then jetted into the water muffler 27c, whereafter it is discharged together with exhaust gas into water current produced by the jet pump 30 through the exhaust and drain pipe 27d.

According to such a supercharger cooling structure for a small watercraft as described above, the following operation and effects are obtained.

A small watercraft, in which an engine with a supercharger is incorporated, is structured such that cooling water from the pump 30 is supplied to the supercharger 140 by the different supercharger cooling water passage 148a independent of any other cooling water passage. Accordingly, the supercharger 140 can be cooled efficiently and sufficiently.

The cooling water from the supercharger cooling water passage 148a is first supplied to the supercharger 140 to cool the supercharger 140 and is then supplied to the exhaust system (exhaust pipe 27a, backflow preventing chamber 27b, water muffler 27c, exhaust and drain pipe 27d) provided downstream from the supercharger 140 in the exhaust system for the engine 20. Accordingly, the supercharger 140 can be cooled with cooling water which has a low temperature. Therefore, the supercharger 140 can be cooled further efficiently and sufficiently. Furthermore, the exhaust system provided downstream from the supercharger 140 can be cooled.

The cooling water having cooled the supercharger 140 is discharged to the outside of the watercraft 10 together with exhaust gas after it is supplied to the exhaust pipe 27a provided downstream from the supercharger 140 in the exhaust system. Accordingly, the exhaust gas, which has driven the supercharger 140, is further cooled in the exhaust pipe 27a.

In other words, since the exhaust gas is cooled in the supercharger 140 and the exhaust pipe 27a, the exhaust gas energy can be reduced synergetically. As a result, the exhaust noise can be reduced.

Oil is supplied to the supercharger 140. The oil is used to lubricate the bearing portion 142 of the supercharger 140 and is supplied to the oil jacket 146 formed in the bearing casing 141 to cool the bearing casing 141. Accordingly, the supercharger 140 is cooled more efficiently.

The engine 20 is provided in the body 11 formed from the hull 14 and the deck 15 and the supercharger 140 is provided for the engine 20. In addition, the oil exits 146a, 146b of the supercharger 140 are disposed higher than the oil surface O1 when the engine stops. Accordingly, if the engine 20 is stopped (if the operation of the oil pump 80 is stopped), then the oil in the supercharger 140 is discharged quickly from the oil exits 146a, 146b.

If oil resides in the supercharger 140 which has a high temperature immediately after the engine stops, then the resident oil is liable to be carbonized. As a result, there is a problem in that the entire oil which circulates in the engine 20 is liable to be degraded. However, with the small watercraft 10, in which the engine with a supercharger of the present embodiment is incorporated, if the engine 20 stops, then oil in the supercharger 140 is discharged rapidly from the oil exits 146a, 146b. Accordingly, the oil which may reside in the supercharger 140 after the engine stops can be minimized to reduce the degradation of the entire oil.

The engine 20 is a dry sump type engine and the oil tank 50 is provided on an extension line of the crankshaft thereof. Accordingly, the oil surface O1 when the engine stops can be set low.

Accordingly, oil in the supercharger 140 is discharged more quickly from the oil exits 146a, 146b. As a result, the deterioration of the entire oil is further reduced.

The one-way valve 147 is interposed in each of the oil returning passages 25b, 25c in communication with the oil exits 146a, 146b of the supercharger 140. Accordingly, when the small watercraft 10 capsizes, such a situation that oil reversely flows from the oil pan 28 to the supercharger 140 which is in a high temperature state and resides in the supercharger 140 is eliminated.

Accordingly, carbonization of oil can be prevented with a higher degree of certainty, and degradation of the entire oil can be reduced with a higher degree of certainty.

The supercharger 140 and an end portion of the main gallery 20a for oil provided in parallel to the crankshaft 21 of the engine 20 are in communication with each other by the oil supply passage 25a. Accordingly, oil is supplied from the end portion of the main gallery 20a to the supercharger 140 directly through the oil supply passage 25a.

Accordingly, the time until oil is supplied to the supercharger 140 after the engine is started is reduced, and quick and reliable operation of the supercharger 140 can be achieved.

The oil pump 80 is provided on the front side of the body 11 with respect to the engine 20 while the supercharger 140 is provided on the rear side of the body 11 and the supercharger 140 and the rear end portion of the main gallery 20a are in communication with each other by the oil supply passage 25a. Accordingly, oil can be supplied rapidly to the supercharger 140 rearwardly of the engine.

Oil supplied to the supercharger 140 is used to lubricate the bearing portion 142 of the supercharger 140 and is supplied to the oil jacket 146 formed in the bearing casing 141 to cool the bearing casing 141. Accordingly, in addition to the bearing portion 142 of the supercharger 140 being lubricated, the bearing casing 141 is cooled.

Furthermore, where lubrication of the bearing portion 142 of the supercharger 140 and cooling of the bearing casing 141 are performed with oil supplied to the supercharger 140 in this manner, it is necessary to quickly supply a greater amount of oil than ever to the supercharger 140. However, with the supercharger cooling structure 10 for a small watercraft of the present embodiment, the oil to the supercharger 140 is supplied from the end portion of the main gallery 20a directly to the supercharger 140 through the oil supply passage 25a. Accordingly, a greater amount of oil can be supplied rapidly.

The hull 14 and the deck 15 of the small watercraft 10 are formed watertight and the opening 15a of the deck 15 is closed up with the lid member 12 to form the body internal space 16. The intake ducts 18, 19 for introducing the atmospheric air outside the body are provided in the space 16 and the engine 20 and the turbocharger 140 connected to the exhaust manifold 24 of the engine 20 are provided in the space 16. In addition, the turbocharger 140 is disposed higher than the body internal openings 18a, 19a of the intake ducts 18, 19. Therefore, when the atmospheric air outside the body is introduced into the body internal space 16 through the intake ducts 18, 19 during running of the small watercraft, even if it is introduced together with water (for example, in the form of droplets), such a situation that the turbocharger 140 becomes wet directly with the water becomes less likely to occur.

Accordingly, the casing and so forth of the turbocharger 140, which have a high temperature, are less likely to be cooled suddenly. In addition, thermal fatigue becomes less likely to occur with the turbocharger 140. As a result, the durability of the turbocharger 140 is augmented.

The water jacket T3 is formed in the casing of the turbine portion 140T of the turbocharger 140 and the oil jacket 146 is formed in the bearing casing 141 for the turbocharger 140. Cooling water is supplied to the water jacket T3 and cooling oil is supplied to the oil jacket 146. Consequently, the temperature of the turbocharger 140 is prevented from becoming excessively high.

Accordingly, when the atmospheric air outside the body is introduced into the body internal space 16 through the intake ducts 18, 19 during running of the small watercraft, even if it is introduced together with water (for example, in the form of droplets) and the turbocharger 140 becomes wet directly with the water, the temperature variation of the casing of the turbocharger 140 by the water is suppressed small.

As a result, thermal fatigue becomes less likely to occur with the turbocharger 140, and the durability of the turbocharger 140 is further augmented.

Cooling water for the water jacket T3 is supplied through the different turbocharger cooling water passage 148a independent of the other cooling water passages. Accordingly, the turbocharger 140 is cooled efficiently.

Accordingly, when the atmospheric air outside the body is introduced into the body internal space 16 through the intake ducts 18, 19 during running of the small watercraft, even if it is introduced together with water (for example, in the form of droplets) and the turbocharger 140 becomes wet directly with the water, the temperature variation of the casing of the turbocharger 140 by the water is further suppressed.

As a result, thermal fatigue becomes further less likely to occur with the turbocharger 140, and the durability of the turbocharger 140 is augmented with a higher degree of certainty.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A supercharger cooling structure for a small watercraft in which an engine with a supercharger is incorporated, said supercharger cooling structure comprising:

a supercharger cooling water passage for supplying cooling water from a jet pump to the supercharger, said supercharger cooling water passage being independent of any other cooling water passage, wherein the supercharger cooling structure is independent of a cooling structure of the engine.

2. The supercharger cooling structure for a small watercraft according to claim 1, wherein the cooling water from said supercharger cooling water passage is first supplied to said supercharger to cool said supercharger and then supplied to an exhaust system of the engine provided downstream from the supercharger.

3. The supercharger cooling structure for a small watercraft according to claim 2, wherein the cooling water from the supercharger is supplied to an exhaust pipe of the exhaust system of the engine provided downstream from the supercharger and is then discharged to an outside of said watercraft together with exhaust gas.

4. The supercharger cooling structure for a small watercraft according to claim 3, wherein oil is supplied to the supercharger, the oil being used for lubrication of a bearing portion of the supercharger and being supplied to an oil jacket formed in a bearing casing to cool the bearing casing.

5. The supercharger cooling structure for a small watercraft according to claim 2, wherein oil is supplied to the supercharger, the oil being used for lubrication of a bearing portion of the supercharger and being supplied to an oil jacket formed in a bearing casing to cool the bearing casing.

6. The supercharger cooling structure for a small watercraft according to claim 1, wherein the cooling water from the supercharger is supplied to an exhaust pipe of an exhaust system of the engine provided downstream from the supercharger and is then discharged to an outside of said watercraft together with exhaust gas.

7. The supercharger cooling structure for a small watercraft according to claim 6, wherein oil is supplied to the supercharger, the oil being used for lubrication of a bearing portion of the supercharger and being supplied to an oil jacket formed in a bearing casing to cool the bearing casing.

8. The supercharger cooling structure for a small watercraft according to claim 1, wherein oil is supplied to the supercharger, the oil being used for lubrication of a bearing portion of the supercharger and being supplied to an oil jacket formed in a bearing casing to cool the bearing casing.

9. A supercharger cooling structure for a small watercraft, said small watercraft including an engine having a supercharger incorporated therein, said supercharger cooling structure comprising:

a supercharger cooling water passage for supplying cooling water from a jet pump to the supercharger, said supercharger cooling water passage for directly connecting the jet pump to the supercharger, wherein the supercharger cooling structure is independent of a cooling structure of the engine.

10. The supercharger cooling structure for a small watercraft according to claim 9, wherein the cooling water from said supercharger cooling water passage is first supplied to said supercharger to cool said supercharger and then supplied to an exhaust system of the engine provided downstream from the supercharger.

11. The supercharger cooling structure for a small watercraft according to claim 10, wherein the cooling water from the supercharger is supplied to an exhaust pipe of the exhaust system of the engine provided downstream from the supercharger and is then discharged to an outside of said watercraft together with exhaust gas.

12. The supercharger cooling structure for a small watercraft according to claim 11, wherein oil is supplied to the supercharger, the oil being used for lubrication of a bearing portion of the supercharger and being supplied to an oil jacket formed in a bearing casing to cool the bearing casing.

13. The supercharger cooling structure for a small watercraft according to claim 10, wherein oil is supplied to the supercharger, the oil being used for lubrication of a bearing portion of the supercharger and being supplied to an oil jacket formed in a bearing casing to cool the bearing casing.

14. The supercharger cooling structure for a small watercraft according to claim 9, wherein the cooling water from the supercharger is supplied to an exhaust pipe of an exhaust system of the engine provided downstream from the supercharger and is then discharged to an outside of said watercraft together with exhaust gas.

15. The supercharger cooling structure for a small watercraft according to claim 14, wherein oil is supplied to the supercharger, the oil being used for lubrication of a bearing portion of the supercharger and being supplied to an oil jacket formed in a bearing casing to cool the bearing casing.

16. The supercharger cooling structure for a small watercraft according to claim 9, wherein oil is supplied to the supercharger, the oil being used for lubrication of a bearing portion of the supercharger and being supplied to an oil jacket formed in a bearing casing to cool the bearing casing.

* * * * *